United States Patent
Hughes et al.

(10) Patent No.: US 11,122,084 B1
(45) Date of Patent: Sep. 14, 2021

(54) AUTOMATIC MONITORING AND MODELING

(71) Applicant: Wells Fargo Bank, N.A., San Francisco, CA (US)

(72) Inventors: Noah L. Hughes, Iowa City, IA (US); John E. Eisenhauer, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 297 days.

(21) Appl. No.: 16/222,418

(22) Filed: Dec. 17, 2018

(51) Int. Cl.
| | |
|---|---|
| *H04L 29/06* | (2006.01) |
| *H04L 12/26* | (2006.01) |
| *G06N 20/00* | (2019.01) |

(52) U.S. Cl.
CPC ............. *H04L 63/20* (2013.01); *G06N 20/00* (2019.01); *H04L 43/08* (2013.01); *H04L 43/0817* (2013.01); *H04L 63/1425* (2013.01)

(58) Field of Classification Search
CPC ..... H04L 63/20; H04L 63/1425; H04L 43/08; H04L 43/0817; G06N 20/00
See application file for complete search history.

(56) References Cited

U.S. PATENT DOCUMENTS

| | | | |
|---|---|---|---|
| 6,549,944 B1 | 4/2003 | Weinberg et al. | |
| 8,161,152 B2 | 4/2012 | Ogielski et al. | |
| 8,528,091 B2 | 9/2013 | Bowen et al. | |
| 8,566,928 B2 | 10/2013 | Dagon et al. | |
| 8,881,279 B2 | 11/2014 | Gregg | |
| 8,887,286 B2 | 11/2014 | Dupont et al. | |
| 9,118,708 B2 | 8/2015 | Oliphant et al. | |
| 9,210,180 B2 | 12/2015 | Zisapel et al. | |
| 9,407,655 B2 | 8/2016 | Futty | |
| 9,786,176 B2 | 10/2017 | Northrup et al. | |

(Continued)

OTHER PUBLICATIONS

Louit et al., "A practical procedure for the selection of time-to-failure models based on the assessment of trends in maintenance data", Reliability Engineering and System Safety, Apr. 2009, pp. 1618-1628 (Year: 2009).*

(Continued)

*Primary Examiner* — Thaddeus J Plecha
(74) *Attorney, Agent, or Firm* — Kilpatrick Townsend & Stockton LLP

(57) ABSTRACT

The innovation disclosed and claimed herein, in one aspect thereof, comprises systems and methods of automatic classification and modeling. The innovation can include determining a failure history of networked architecture, the failure history including data immediately prior to failure. The innovation can include machine learning the failure history to determine failure indicators. The innovation can include generating a black hole model based on the failure history and the machine learning. The innovation can include monitoring a networked architecture. The networked architecture has a set of elements comprising software elements and hardware elements interconnected in a common environment. Each element of the set of elements is monitored. The innovation can include determining an element is trending towards a failure. The trend is determined by a black hole model. The innovation can include enabling security features to prevent the element from failure.

15 Claims, 6 Drawing Sheets

(56) References Cited

U.S. PATENT DOCUMENTS

| | | | |
|---|---|---|---|
| 9,787,715 B2 | 10/2017 | Touboul et al. | |
| 9,940,373 B2 | 4/2018 | Russell et al. | |
| 2006/0111857 A1* | 5/2006 | Shah | G01D 1/00 |
| | | | 702/85 |
| 2010/0318837 A1* | 12/2010 | Murphy | G06F 11/1461 |
| | | | 714/4.1 |
| 2012/0023041 A1* | 1/2012 | Kariv | H04L 41/142 |
| | | | 706/12 |
| 2017/0063899 A1 | 3/2017 | Muddu et al. | |
| 2019/0324430 A1* | 10/2019 | Herzog | G07C 5/006 |
| 2020/0026590 A1* | 1/2020 | Lopez | G05B 19/4065 |

OTHER PUBLICATIONS

Chun-Jen Chung, et al. "NICE: Network Intrusion Detection and Countermeasure Selection in Virtual Network Systems," IEEE Transaction son Dependable and Secure Computing; Jan. 24, 2013, vol. 10, Issue 4, IEEE, pp. 198-211.

Ting-Fang Yen, et al. "Beehive: Large-Scale Log Analysis for Detecting Suspicious Activity in Enterprise Networks," Annual Computer Security Applications Conference Dec. 9-13, 2003, New Orleans, Louisiana, 10 pages.

"Azure Advanced Threat Detection," Microsoft Docs, retrieved on Jan. 10, 2019 from: https://docs.microsoft.com/en-us/azure/security/azure-threat-detection.

* cited by examiner

AUTOMATIC MONITORING AND MODELING

BACKGROUND

Networks are often becoming more complex and more distributed. Especially for large corporations or financial institutions. The networks continuously are adding network elements to the network that have different configurations, security policies, access policies, and/or the like. It is becoming increasingly difficult to monitoring each element to ensure they are running according to specifications. It is important to define when certain elements move from a valid state to a failed state. It is also important to detect elements that are moving from the valid state to a failed state and prevent the elements from failure.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of automatic monitoring and modeling. The method includes monitoring a networked architecture. The networked architecture has a set of elements comprising software elements and hardware elements interconnected in a common environment. Each element of the set of elements is monitored. The method includes determining an element is trending towards a failure. The trend determined by a black hole model. The method includes enabling security features to prevent the element from failure.

A system of the innovation can include a monitor component that monitors a networked architecture, the networked architecture having a set of elements comprising software elements and hardware elements interconnected in a common environment, wherein each element of the set of elements is monitored. A trend component determines an element is trending towards a failure, the trend determined by a black hole model. A security component enables security features to prevent the element from failure.

A computer readable medium having instructions to control one or more processors. The instructions can include determining a failure history of networked architecture, the failure history including data immediately prior to failure. The instructions can include machine learning the failure history to determine failure indicators. The instructions can include generating a black hole model based on the failure history and the machine learning.

In aspects, the subject innovation provides substantial benefits in terms of monitoring an environment and a networked architecture. One advantage resides in preventing failures before a failure point. Another advantage resides in using an updated model to predict potential failures.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
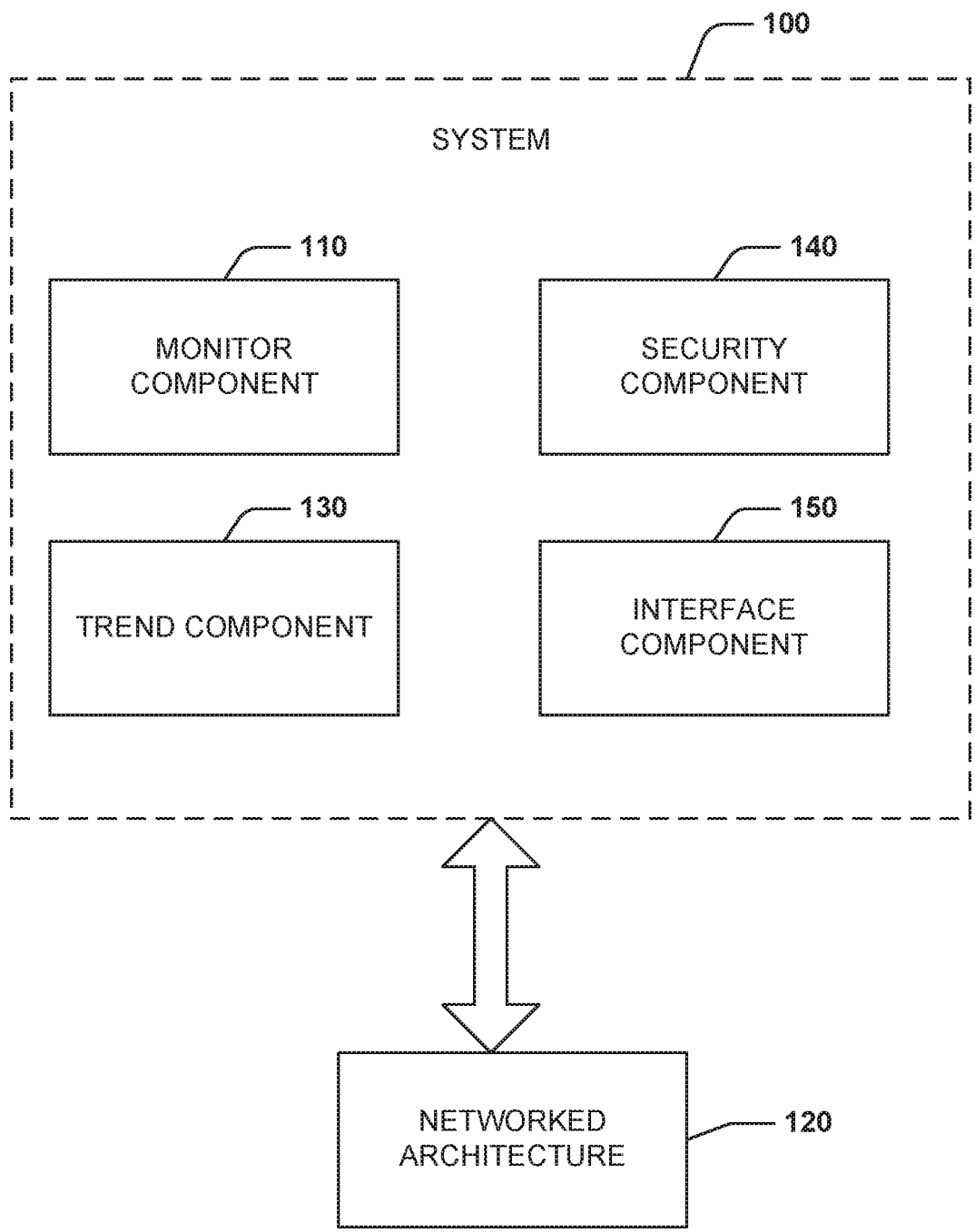
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for automatic monitoring and modeling. The system 100 includes a monitor component 110. The monitor component 110 monitors a networked architecture 120. In some embodiments, the networked architecture 120 includes elements interconnected in a common environment. The elements can include software elements, hardware elements, and/or the like. The environment can be a distributed system, open network, closed network, local area network, and/or the like through which data and/or network traffic traverses to connect the elements.

The monitor component 110 captures data of a set of elements of the networked architecture 120. In some embodiments, the monitor component 110 captures data over a period of time, real (or near real) time, and/or continuously. In some embodiments, each element of the set of elements includes a unique identifier and/or a type identifier to distinguish elements on the networked architecture 120. For example, a software element may be unique to a specific device but also have server copies of the same software elements on multiple devices in the environment. The unique identifier can indicate the element on the specific device and the type identifier can indicate all copies installed of the same software element. In some embodiments, a unique identifier is a serial number, MAC address, IP address, network name, and/or the like. In some embodiments, the type identifier is product name, brand name, model number, workgroup, and/or the like.

In some embodiments, the monitor component 110 stores data over time associated with the elements. Example element data can include: performance response time, utilization, processing, connections, registries, frequent connection characteristics, logging in system users, authenticated accounts, domains accessed, installed modules, installed software, meta data, external references to the set of elements, vulnerabilities, threat indicators, and/or the like.

The system 100 includes a trend component 130. The trend component 130 determines an element is trending towards a failure. The trend component 130 determines the trend according to a black hole model and the element in question in relation to the black hole model. The black hole model is a model of a failed element. The black hole model represents a failure point in relation to elements in the networked architecture 120. In some embodiments, the black hole model replicates a previously failed element. In other embodiments, the black hole model replicates a set of previously failed elements. The black hole model includes data as failure indicators to facilitate determining when a present element in the networked architecture 120 is trending towards the black hole model. In some embodiments, there are different black hole models for different types of elements in the networked architecture.

In some embodiments, the trend component 130 can generate the black hole model. The black hole model can be based on at least one previous element failure. The trend component 130 determines a failure history of at least one similar element. The failure history can include captured data immediately prior to the failure. In some embodiments, the trend component 130 can employ machine learning techniques with the failure history. The machine learning can determine failure indicators to generate a representative black hole model of a failed element(s). In some embodiments, the trend component 130 can learn from the captured data of a present failure for future configuration decisions using machine learning techniques, artificial intelligence, deep learning intelligence, and/or the like.

The trend component 130 compares the captured data of the element from the monitor component to the black hole model to determine whether the element is trending towards the black hole model. The trend component 130 can calculate metrics of each element in the networked architecture 120 based on the data captured by the monitor component 110. The trend component 130 determines a distance of the element in relation to the black hole model based on the comparison. The distance is a metric representative of how far (or close) an element is to the black hole model (e.g. failure). The distance is a snapshot of the element in the present state or real (or near real) time status in relation to the black hole model. The distance can be a metric score that represents the overall status of the data of an element.

The trend component 130 determines a velocity of the trend. The velocity can be determined using the black hole model and a change in captured data. The velocity is a metric representative of how quickly the element is trending towards the black hole model. The velocity can be a metric that measures a degree of change or delta between captured data over time. The velocity can be an aggregate of different individual velocities of some or all captured data points in the captured data.

The trend component 130 can generate a distance threshold and a velocity threshold to which element data can be compared to determine a trend towards the black hole model. The trend component 130 dynamically compares the distance and/or velocity to the threshold distance and/or the threshold velocity respectively. The trend component 130 uses the comparison to determine that the element is trending towards the black hole model. In some embodiments, the trend component 130 uses both the distance and the velocity in relation to the black hole model to determine whether security features should be enabled. For example, if the distance is below the threshold distance and/or the velocity is above the threshold velocity, security features can be determined to be enabled. In some embodiments, a plurality of threshold levels for each metric can determine different security features, alerts, or actions.

In some embodiments, the distance and the velocity can be aggregated, averaged, weighted average, and/or the like into an aggregated score or metric. The aggregated score can be compared to a threshold aggregated score that is an aggregate, average, weighted average, and/or the like of the threshold distance and threshold velocity.

The system 100 can include a security component 140. The security component 140 enables security features to prevent the element from failure. In some embodiments, the security features can be alerting a network administrator. In other embodiments, the security component 140 can automatically enable security features such as, but not limited to, quarantine of an element, virtualization of an element, reconfiguring the element, take element offline, replace element, and/or the like.

In some embodiments, the system 100 includes an interface component 150. The interface component 150 can generate a virtual view of each element in the set of elements in relation to the black hole model or a plurality of black hole models. The virtual view can place or depict each element at their corresponding real-time distance. The virtual view can be updated according to velocity and distance of each element to the black hole model in real or near real time.

Figure 2:
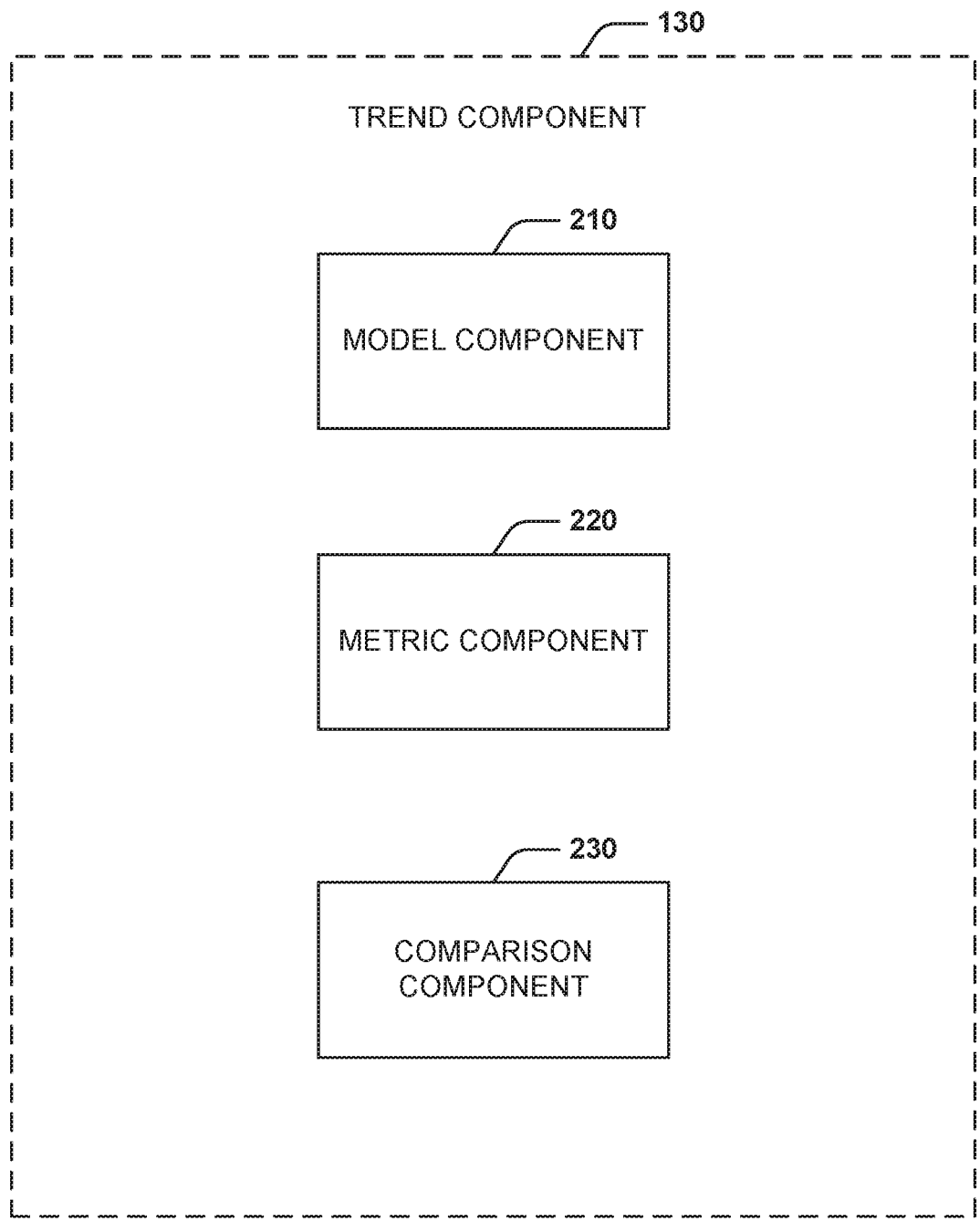
FIG. 2 illustrates an example component diagram of a trend component.

FIG. 2 illustrates a detailed component diagram of the trend component 130. The trend component 130 includes a model component 210. The model component 210 generates the black hole model. The black hole model can be based on at least one previous element failure. The model component 210 determines a failure history of at least one similar element. The failure history can include captured data immediately prior to the failure. In some embodiments, the model component 210 can employ machine learning techniques with the failure history. The machine learning can determine failure indicators to generate a representative black hole model of a failed element(s). In some embodiments, the model component 210 can learn from the captured data of a present failure for future configuration decisions using machine learning techniques, artificial intelligence, deep learning intelligence, and/or the like. The model component 210 can generate a distance threshold and a velocity threshold to which element data can be compared to determine a trend towards the black hole model.

The trend component 130 includes a metric component 220. The metric component 220 can calculate metrics of each element in the networked architecture 120 based on the data captured by the monitor component 110. The metric component 220 determines a distance of the element in relation to the black hole model based on the comparison. The distance is a metric representative of how far (or close) an element is to the black hole model (e.g. failure). The distance is a snapshot of the element in the present state or real (or near real) time status in relation to the black hole model. The distance can be a metric score that represents the overall status of the data of an element.

The metric component 220 determines a velocity of the trend. The velocity can be determined using the black hole model and a change in captured data. The velocity is a metric representative of how quickly the element is trending towards the black hole model. The velocity can be a metric that measures a degree of change or delta between captured data over time. The velocity can be an aggregate of different individual velocities of some or all captured data points in the captured data.

The trend component 130 includes a comparison component 230. The comparison component 230 compares the captured data of the element from the monitor component 110 to the black hole model to determine whether the element is trending towards the black hole model.

The comparison component 230 dynamically compares the distance and/or velocity to the threshold distance and/or the threshold velocity respectively. The comparison component 230 uses the comparison to determine that the element is trending towards the black hole model. In some embodiments, the comparison component 230 uses both the distance and the velocity in relation to the black hole model to determine whether security features should be enabled. For example, if the distance is below the threshold distance and/or the velocity is above the threshold velocity, security features can be determined to be enabled. In some embodiments, a plurality of threshold levels for each metric can determine different security features, alerts, or actions.

Figure 3:
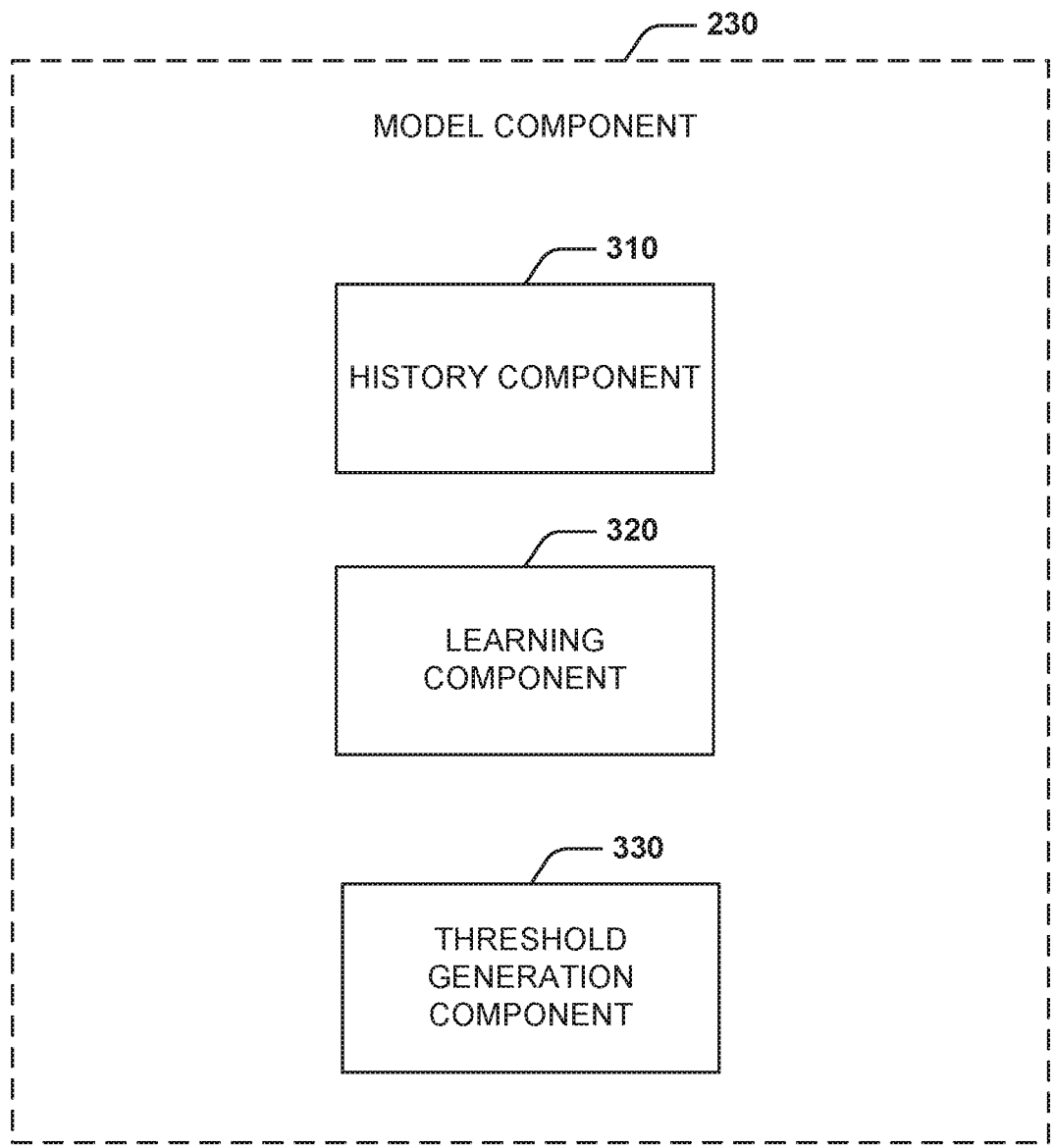
FIG. 3 illustrates an example component diagram of a model component.

FIG. 3 illustrates a detailed component diagram of a model component 210. The black hole model can be based on at least one previous element failure. The model component 210 includes a history component 310. The history component 310 determines a failure history of at least one similar element. The failure history can include captured data immediately prior to the failure and immediately after the failure.

The model component 210 can include a learning component 320. The learning component 320 employs machine learning techniques with the failure history from the history component 310. The machine learning can determine failure indicators to generate a representative black hole model of a failed element(s). In some embodiments, the learning component 320 can learn from the captured data of a present failure for future configuration decisions using machine learning techniques, artificial intelligence, deep learning intelligence, and/or the like.

The model component 210 can include a threshold generation component 330. The threshold generation component 330 generates a distance threshold and a velocity threshold to which element data can be compared to determine a trend towards the black hole model. In some embodiments, the threshold generation component 330 can generate distances and velocities of the elements as they move from validity to failure to determine the distance threshold and velocity threshold (e.g. a tipping point or a predetermine amount away from the tipping point from validity to failure). In some embodiments, the threshold generation component 330 can generate a plurality of distance thresholds and a plurality of velocity thresholds.

Figure 4:
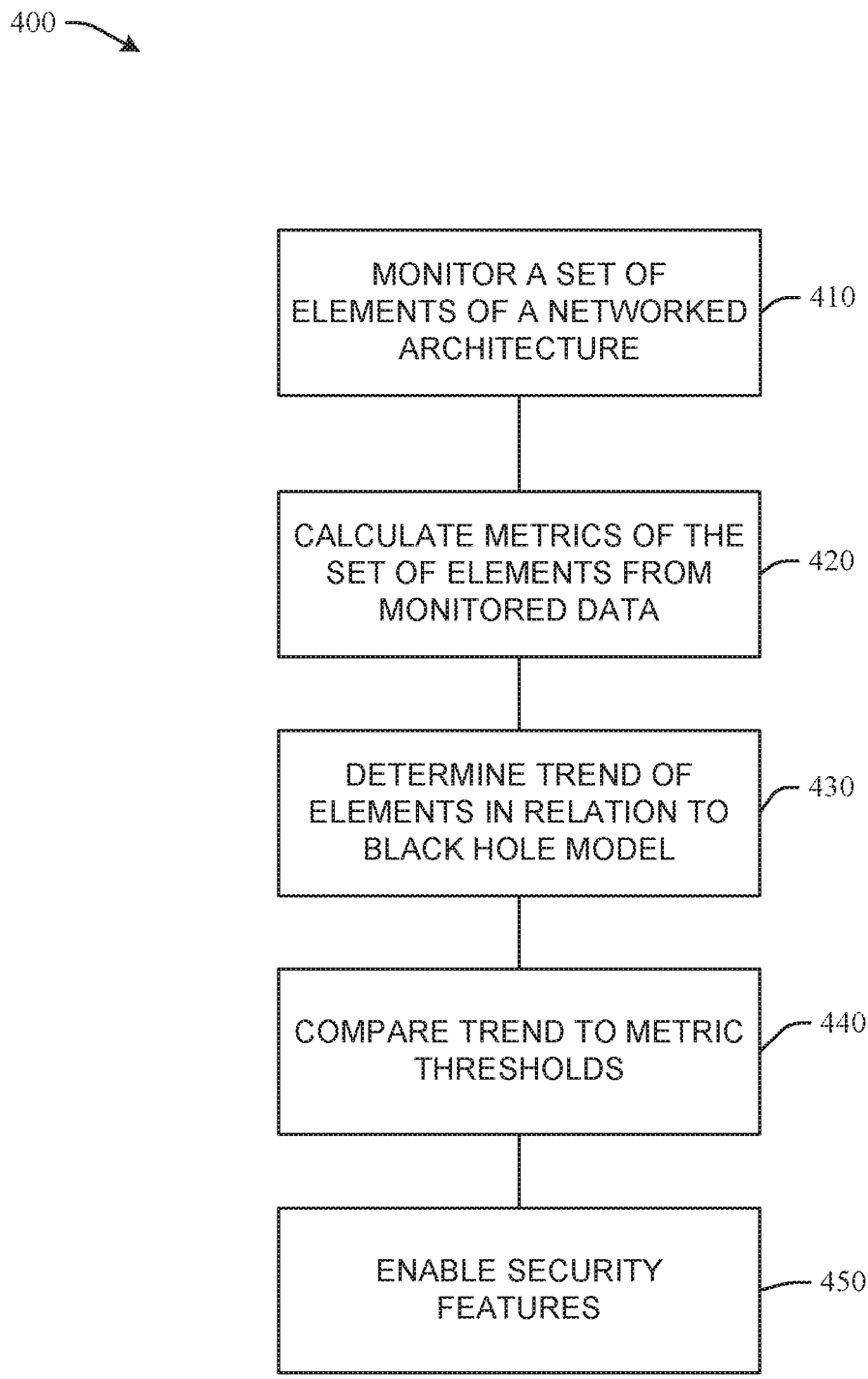
FIG. 4 illustrates a method for automatic classification and management.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

FIG. 4 illustrates a method 400 for automatic monitoring and modeling. At 410, a set of elements in a networked architecture are monitored. At 420, metrics are calculated for the set of elements. For example, a distance and a velocity can be calculated for each element in the set of elements. At 430, a trend is determined in relation to a black hole model. The trend can be determined by the metrics calculated in relation to the black hole model. At 440, the trend and/or metrics can be compared to metric thresholds to determine the trend. At 450, if a trend towards the black hole model for an element meets one or more thresholds, security features are enabled to alert, protect, and/or the like the networked architecture.

Figure 5:
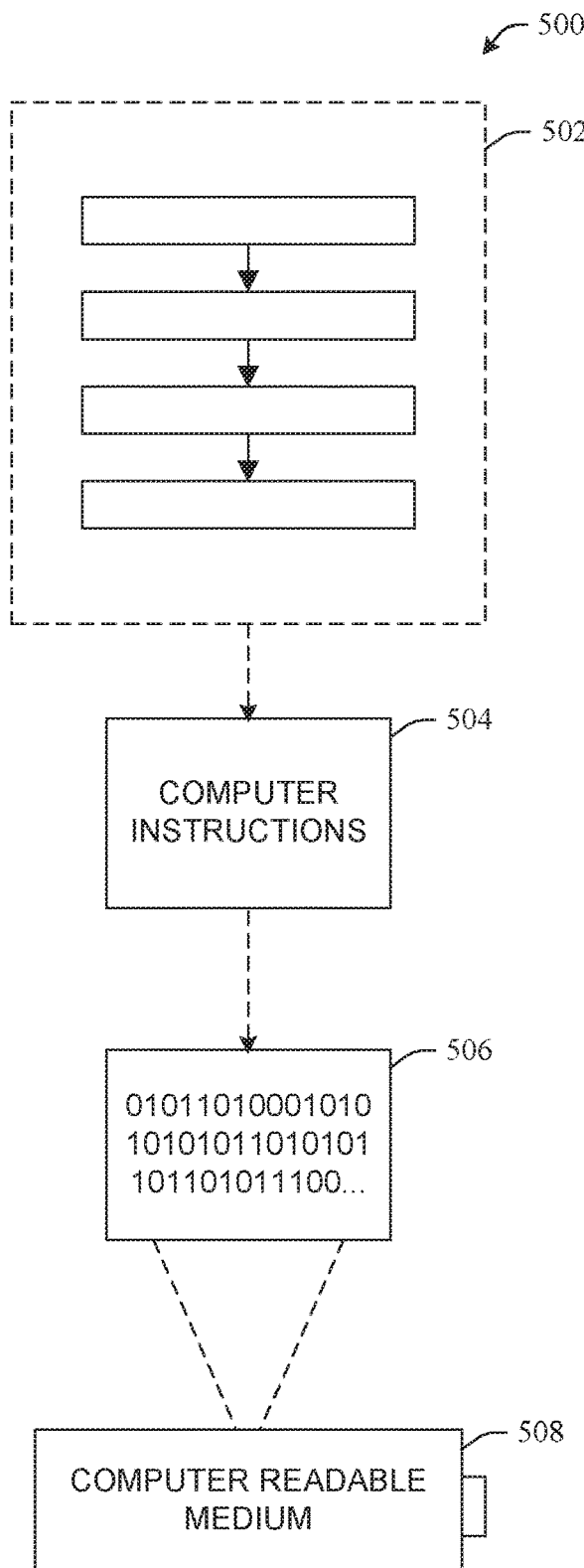
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
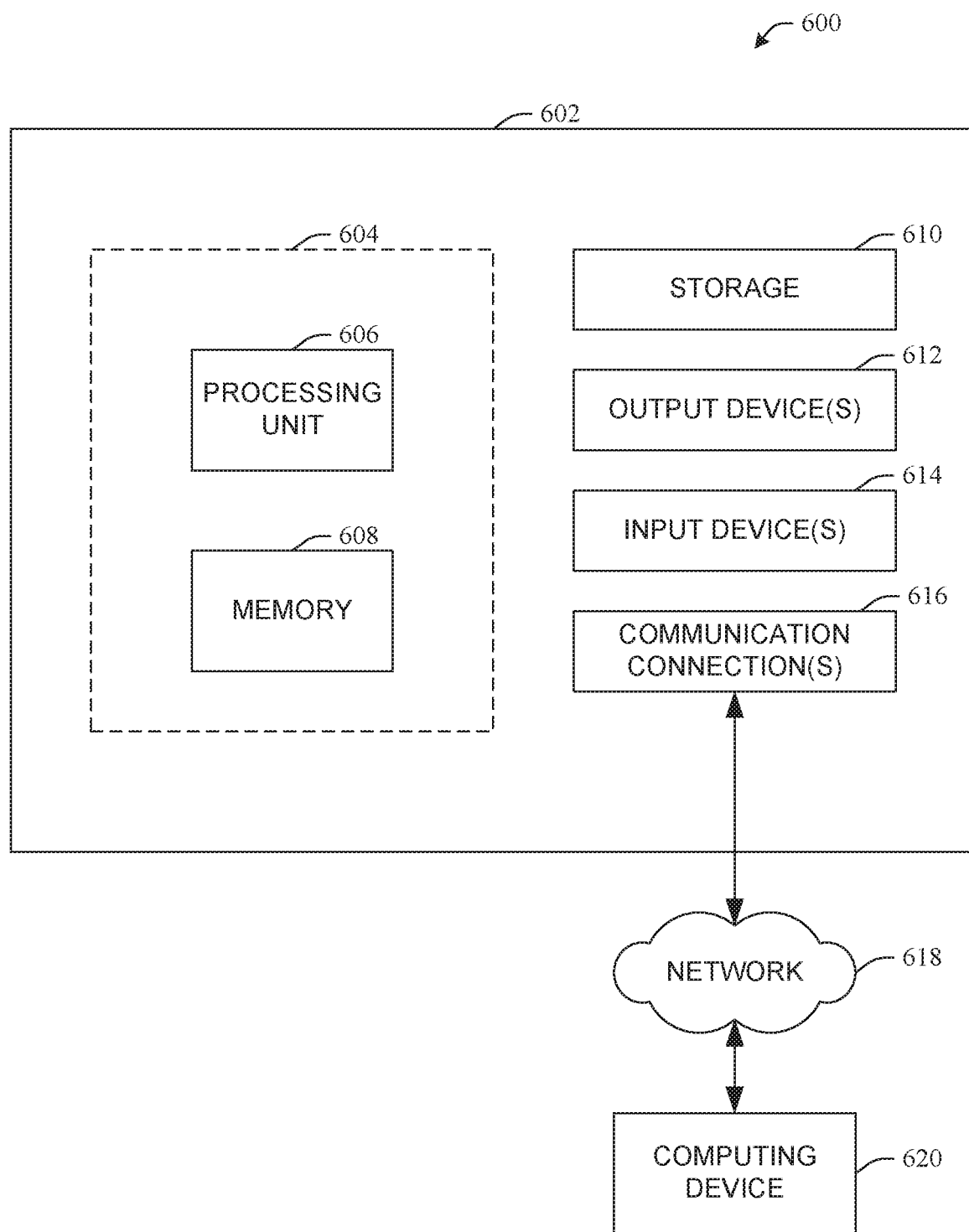
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    monitoring a networked architecture, the networked architecture having a set of elements comprising software elements and hardware elements interconnected in a common environment, wherein each element of the set of elements is monitored;
    determining a trend of an element of the set of elements towards a failure, the trend determined by a black hole model, wherein the determining comprises:
        capturing data over time associated with the element, the captured data including at least one of performance response time, utilization, processing, connections, registries, frequent connection characteristics, logging in system users, authenticated accounts, domains accessed, installed modules, installed software, meta data, external references to the set of elements, vulnerabilities, or threat indicators;
        comparing the captured data of the element to the black hole model to determine whether the element is trending towards the black hole model;
        determining a distance of the element in relation to the black hole model based on the comparison; and
        determining a velocity of the trend based on the black hole model and a change in the captured data; and
    enabling security features to prevent the element from failure based on the trend.

2. The method of claim 1, comprising:
dynamically comparing the distance and velocity to a threshold distance and a threshold velocity to determine that the element is trending towards the black hole model.

3. The method of claim 1, comprising:
generating the black hole model based on at least one previous element failure.

4. The method of claim 3, comprising:
determining a failure history of the at least one previous element failure, the failure history including data immediately prior to failure; and
machine learning the data to determine failure indicators to generate the black hole model.

5. The method of claim 4, comprising:
generating a distance threshold and a velocity threshold to which the data can be compared to determine a trend towards the black hole model.

6. The method of claim 1, comprising:
generating a virtual view of each element in the set of elements in relation to the black hole model, wherein each element is placed at a corresponding real-time distance, and wherein the virtual view can be updated according to the velocity and the distance of each element to the black hole model.

7. A system, comprising:
a monitor component that monitors a networked architecture, the networked architecture having a set of elements comprising software elements and hardware elements interconnected in a common environment, wherein each element of the set of elements is monitored;
a trend component that determines a trend of an element of the set of elements towards a failure, the trend determined by a black hole model; and
a security component that enables security features to prevent the element from failure; and
an interface component that generates a virtual view of each element in the set of elements in relation to the black hole model, wherein each element is placed at a corresponding real-time distance, and wherein the virtual view can be updated according to a velocity and a distance of each element to the black hole model.

8. The system of claim 7, comprising:
wherein the monitor component captures and stores data over time associated with the element, the captured data including at least one of performance response time, utilization, processing, connections, registries, frequent connection characteristics, logging in system users, authenticated accounts, domains accessed, installed modules, installed software, meta data, external references to the set of elements, vulnerabilities, or threat indicators.

9. The system of claim 8, the trend component comprising:
a comparison component that compares the captured data of the element to the black hole model to determine whether the element is trending towards the black hole model.

10. The system of claim 9, the trend component comprising:
a metric component that:
determines the distance of the element in relation to the black hole model based on the comparison; and
determines the velocity of the trend based on the black hole model and a change in the captured data.

11. The system of claim 10, comprising:
wherein the comparison component dynamically compares the distance and the velocity to a threshold distance and a threshold velocity to determine that the element is trending towards the black hole model.

12. The system of claim 7, comprising:
a model component that generates the black hole model based on at least one previous element failure.

13. The system of claim 12, the model component comprising:
a history component that determines a failure history of the at least one previous element failure, the failure history including data immediately prior to failure; and
a learning component that machine learns the failure history to determine failure indicators to generate the black hole model.

14. The system of claim 13, the modeling component comprising:
a threshold component that generates a distance threshold and a velocity threshold to which data can be compared to determine a trend towards the black hole model.

15. A non-transitory computer readable medium having instructions to control one or more processors configured to:
determine a failure history of networked architecture, the failure history including data immediately prior to failure;
machine learn the failure history to determine failure indicators;
generate a black hole model based on the failure history and the machine learning;
generate a distance threshold and a velocity threshold to which data can be compared to determine a trend towards the black hole model; and
enabling security features to prevent an element of the networked architecture from failure based on the trend.

* * * * *